United States Patent
Yaldo et al.

(10) Patent No.: US 10,286,904 B2
(45) Date of Patent: May 14, 2019

(54) AUTONOMOUS VEHICLE PARKING METHODS AND SYSTEMS

(71) Applicant: GM GLOBAL TECHNOLOGY OPERATIONS LLC, Detroit, MI (US)

(72) Inventors: Valor Yaldo, West Bloomfield, MI (US); Xiaofeng F. Song, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 137 days.

(21) Appl. No.: 15/620,446

(22) Filed: Jun. 12, 2017

(65) Prior Publication Data

US 2018/0354502 A1    Dec. 13, 2018

(51) Int. Cl.
| | |
|---|---|
| *B60W 30/06* | (2006.01) |
| *G05D 1/00* | (2006.01) |
| *G08G 1/14* | (2006.01) |
| *H04W 4/46* | (2018.01) |
| *H04W 4/80* | (2018.01) |
| *G01S 19/13* | (2010.01) |
| *H04W 84/12* | (2009.01) |
| *H04W 4/44* | (2018.01) |

(52) U.S. Cl.
CPC ........... *B60W 30/06* (2013.01); *G05D 1/0088* (2013.01); *G08G 1/143* (2013.01); *H04W 4/46* (2018.02); *B60W 2420/42* (2013.01); *B60W 2420/52* (2013.01); *B60W 2420/54* (2013.01); *B60W 2510/30* (2013.01); *B60W 2750/40* (2013.01); *G01S 19/13* (2013.01); *H04W 4/44* (2018.02); *H04W 4/80* (2018.02); *H04W 84/12* (2013.01)

(58) Field of Classification Search
CPC .............................. B60W 30/06; G05D 1/0088
See application file for complete search history.

(56) References Cited

U.S. PATENT DOCUMENTS

| | | | | |
|---|---|---|---|---|
| 3,260,842 | A  * | 7/1966 | Davison ................ | B61L 23/168 |
| | | | | 246/131 |
| 9,522,675 | B1 * | 12/2016 | You ........................ | B60W 30/06 |
| 9,739,574 | B1 * | 8/2017 | Vijay ...................... | F41H 11/18 |
| 9,969,386 | B1 * | 5/2018 | Wang ..................... | B60W 30/06 |
| 2007/0182550 | A1 * | 8/2007 | Castello ............... | B61D 19/026 |
| | | | | 340/541 |
| 2009/0314590 | A1 * | 12/2009 | Dagh ....................... | B60T 7/12 |
| | | | | 188/110 |

(Continued)

FOREIGN PATENT DOCUMENTS

JP         2003016487 A  *  1/2003

*Primary Examiner* — Alex C Dunn
(74) *Attorney, Agent, or Firm* — Lorenz & Kopf, LLP

(57) ABSTRACT

Methods and systems are provided for controlling parking of an autonomous vehicle. A method of parking an autonomous vehicle includes receiving sensor data indicative of an exterior environment of the autonomous vehicle. The received sensor data is processed to determine a parking space characterization. Additional sensor data is received that is indicative of an occupant location within the autonomous vehicle. A processor determines a parking position within a parking space based on the parking space characterization and the occupant location. The processor generates control signals to operate one or more actuator devices to maneuver the autonomous vehicle into the parking space at the parking position.

18 Claims, 5 Drawing Sheets

(56) References Cited

U.S. PATENT DOCUMENTS

2010/0271224 A1* 10/2010 Varasteh ................ A61J 7/04
                                                      340/644
2014/0176348 A1*  6/2014 Acker, Jr. ............ G08G 1/144
                                                     340/932.2
2017/0123421 A1*  5/2017 Kentley ................ G01C 21/26
2017/0267233 A1*  9/2017 Minster ................ B62D 15/02
2017/0284142 A1* 10/2017 Jaranson ............... E05C 17/203
2017/0364094 A1* 12/2017 Yang ................... G03B 15/006
2018/0031604 A1*  2/2018 Chennakeshu .......... G01C 9/02
2018/0164830 A1*  6/2018 Moosaei ............ G06K 9/00798
2018/0164831 A1*  6/2018 Han ........................ B60R 1/00
2018/0350170 A1* 12/2018 Wang ................ G07C 9/00309
2018/0356821 A1* 12/2018 Kentley-Klay ....... B60W 30/00

* cited by examiner

AUTONOMOUS VEHICLE PARKING METHODS AND SYSTEMS

TECHNICAL FIELD

The present disclosure generally relates to autonomous vehicles, and more particularly relates to methods and systems of parking an autonomous vehicle.

INTRODUCTION

An autonomous vehicle is a vehicle capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

A parking facility may include parking spaces within which vehicles may be parked, and aisles for accessing the parking spaces. A parking space may have a length, which is its longitudinal dimension relative to a vehicle parked within the space, and a width, which is its lateral dimension relative to a vehicle parked in the space. The length and width of parking spaces may be designed to contain typical vehicles. Parking a vehicle can be challenging, whether under the control of a driver or under autonomous control. Parking areas may be crowded, spaces within a lot may be inconsistent, and various obstacles commonly exist. Maneuvering a vehicle into a parking space requires coordinated control of steering acceleration and braking.

Accordingly, it is desirable to provide systems and methods that facilitate autonomous vehicle parking. Furthermore, other desirable features and characteristics of the present invention will become apparent from the subsequent detailed description and the appended claims, taken in conjunction with the accompanying drawings and the foregoing technical field and introduction.

SUMMARY

Methods and systems are provided for controlling a vehicle. In various embodiments, a method of parking an autonomous vehicle includes receiving sensor data indicative of an exterior environment of the autonomous vehicle. The received sensor data is processed to determine a parking space characterization. Additional sensor data is received that is indicative of an occupant location within the autonomous vehicle. A processor determines a parking position within a parking space based on the parking space characterization and the occupant location. The processor generates control signals to operate one or more actuator devices to maneuver the autonomous vehicle into the parking space at the parking position.

In other embodiments, a system for parking an autonomous vehicle includes a first sensor configured to generate exterior data indicative of an exterior environment of the autonomous vehicle. A processor receives the exterior data and is configured to determine a parking space characterization based on the external data. A second sensor is configured to generate interior data indicative of an occupant location within the autonomous vehicle. The processor is configured to determine a parking position of the autonomous vehicle based on the parking space characterization and the occupant location. One or more actuator devices are configured to maneuver the autonomous vehicle into the parking space at the parking position in response to signals from the processor.

In still other embodiments, an autonomous vehicle includes a body having a number of doors that open. A first sensor is configured to generate exterior data indicative of an exterior environment of the autonomous vehicle. A processor receives the exterior data and is configured to determine a parking space characterization based on the external data. A second sensor is configured to sense opening of the doors to generate interior data indicative of an occupant location within the autonomous vehicle. The processor is configured to determine a parking position of the autonomous vehicle based on the parking space characterization and the occupant location. One or more actuator devices are carried by the body and are configured to maneuver the autonomous vehicle into the parking space at the parking position in response to signals from the processor.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
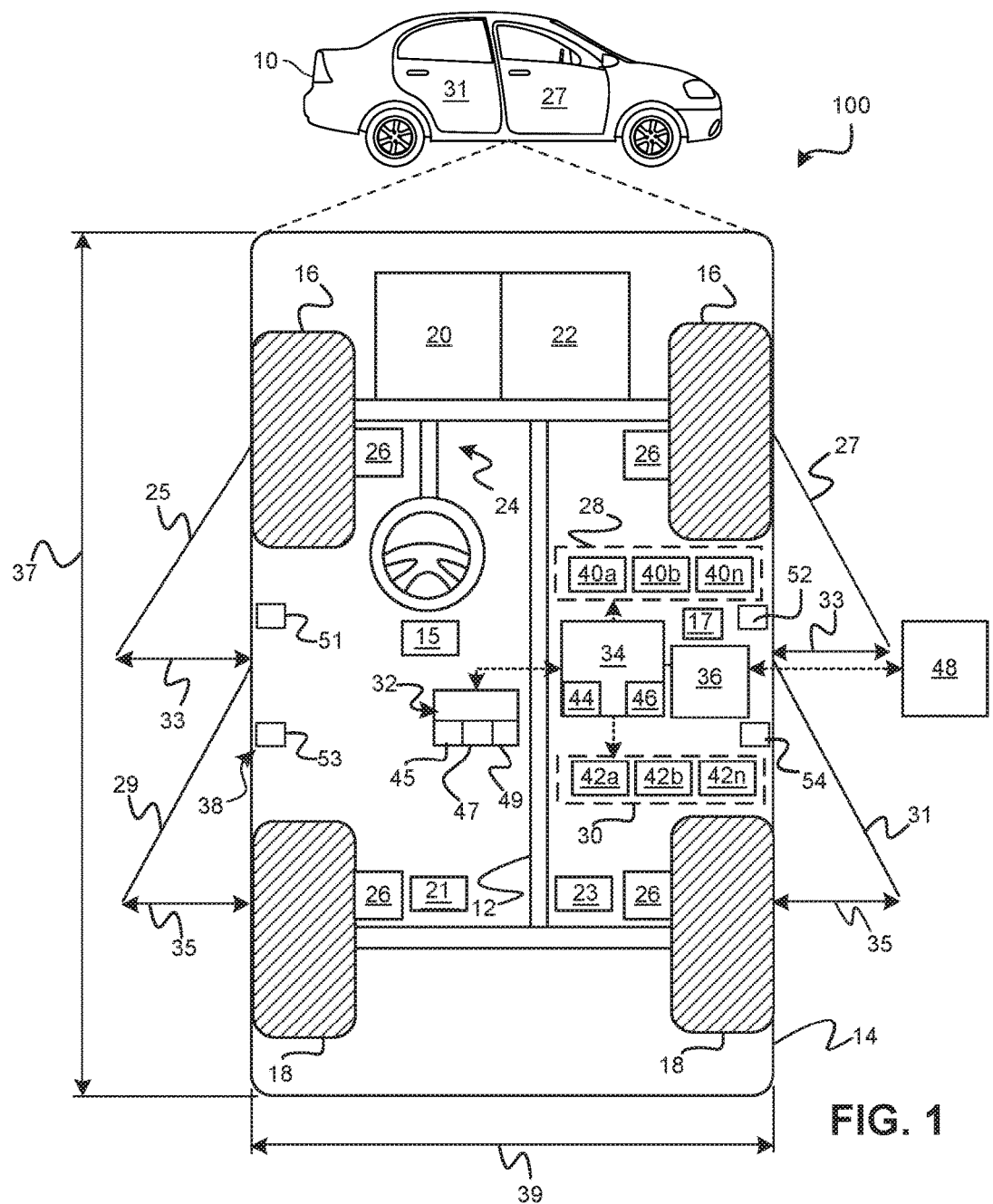
FIG. 1 is a functional block diagram illustrating an autonomous vehicle having a parking system employing methods and systems, in accordance with various embodiments.

With reference to FIG. 1, a parking system shown generally at 100 is associated with a vehicle 10 in accordance with various embodiments. In general, the parking system 100 locates a parking space, determines characteristics of the space, and contributes to intelligent control of the vehicle 10 based thereon. As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The body 14 includes a number of occupant positions such as in a left front seat 15, a right front seat 17, a left rear seat 21, and a right rear seat 23. In other embodiments the seating arrangement will vary depending on the specific vehicle type involved. The wheels 16, 18 are each rotationally coupled to the chassis 12 near a respective corner of the body 14. The vehicle 10 may have physical characteristics including a length 37, a width 39, door open dimensions 33 of the front doors 25, 27, and door open dimensions 35 of the rear doors 29, 31. The door open dimensions 33, 35 extend the overall width of the body 14 by their magnitude, when opened.

In various embodiments, the vehicle 10 is an autonomous vehicle and the parking system 100 is incorporated into the autonomous vehicle 10 (hereinafter referred to as the autonomous vehicle 10). The autonomous vehicle 10 is, for example, a vehicle that is automatically controlled to carry occupants from one location to another. The vehicle 10 is depicted in the illustrated embodiment as a passenger car, but it should be appreciated that the systems, processes and methods described herein may be used in any other vehicle type. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, a communication system 36, and another sensor system 38 that includes a number of sensors 51-54. The propulsion system 20 may, in various embodiments, include an internal combustion engine, an electric machine such as a traction motor, and/or a fuel cell propulsion system. The transmission system 22 may be configured to transmit power from the propulsion system 20 to one or more of the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16, 18. The brake system 26 may, in various embodiments, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions indicative of the exterior environment and/or the interior environment of the autonomous vehicle 10. The sensing devices 40a-40n may include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. In an exemplary embodiment the communication system 36 is configured to communicate with in-vehicle occupants such as through spoken message delivery/speech synthesis and speech recognition.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system. Characteristics of the autonomous vehicle 10, such as the length 37, the width 39, the door open swing dimensions 33 of the front doors 25, 27, and the door open swing dimensions 35 of the rear doors 29, 31, may be stored in the data storage device 32 in a usable data form as dimension values 45. In various examples, these values are known when the vehicle is developed and may be leveraged and stored for reference. For example, the door open swing data is available to determine the lateral offset for use parking of the autonomous vehicle 10 as described below.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor systems 28 and 38, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

The sensor system 38 employs a number of sensors, which in one example includes the sensors 51-54. In other examples the number of sensors may vary depending on factors such as the characteristics of the autonomous vehicle 10 and the type of sensors used. The sensors 51-54 may be any device that discerns information on the location of occupants within the autonomous vehicle 10 and provides that information to the processor 44. For example, the sensors 51-54 provide values indicative of occupant location within the autonomous vehicle 10. In the embodiment of FIG. 1, the sensors 51-54 may be door ajar sensors that detect opening of the doors 25, 27, 29, 31. In other embodiments the occupant locations are determined using fastened seat belt information, interior camera images, or any other available indicator of the seating positions that are occupied. The sensors 51-54 may be used to determine whether a door, such as door 25 has been opened, and the results may be stored in the data storage device 32 as recorded door ajar values 47. The sensors 51-54 may be configured as switches, proximity sensors such as Hall-effect sensors, or other sensing devices. The door ajar sensors 51-54 may be configured to provide a door state signal to the processor 44. When a door is opened, a door open state may be perceived or determined. When a door is closed, a door closed state may be perceived or determined. At least one of the door jar sensors 51-54 may be disposed at each door of the autonomous vehicle 10, where the total number of sensors corresponds to the number of doors. In other embodiments, the sensors 51-54 may be another type of sensor such as those configured to detect occupants. The sensor system 38 may use in-seat sensors such as switches or pressure sensors in seats 15, 17, 21, 23, ultrasonic sensors, infrared sensors, or any sensor capable of discerning the presence on an occupant. The sensor system 38 may provide real-time data on occupant location, or in the case of door ajar sensors, may provide historical data from which occupant location may be derived. For example, when any of the doors 25, 27, 29, 31 are opened for occupant(s) to enter the autonomous vehicle 10, door open state information may be saved in the data storage device 32 as door ajar values 47. The controller 34 may access the memory to obtain data on which doors were opened when the trip began by retrieving the door ajar values 47.

In various embodiments, one or more instructions of the controller 34 are embodied in the parking system 100 and, when executed by the processor 44, control selection and evaluation of an available parking space. For example, the controller 34 may monitor the sensing devices 40a-40n to identify an unoccupied parking space, and to determine characteristics of the space. The autonomous vehicle 10 may scan the parking space and store the results in usable data form as scan values 49. When a selected parking space has limited width, the controller 34 may access the door ajar values 47 to determine which door(s) may be opened when the occupants exit the autonomous vehicle 10. The controller 34 may control parking of the autonomous vehicle 10 through use of the sensing devices 40a-40n and the actuator devices 42a-42n to maneuver the autonomous vehicle 10 into the parking space. The autonomous vehicle 10 may use the door ajar values 47 and the scan values 49 to park in a manner that facilitates exit of the occupants.

Figure 2:
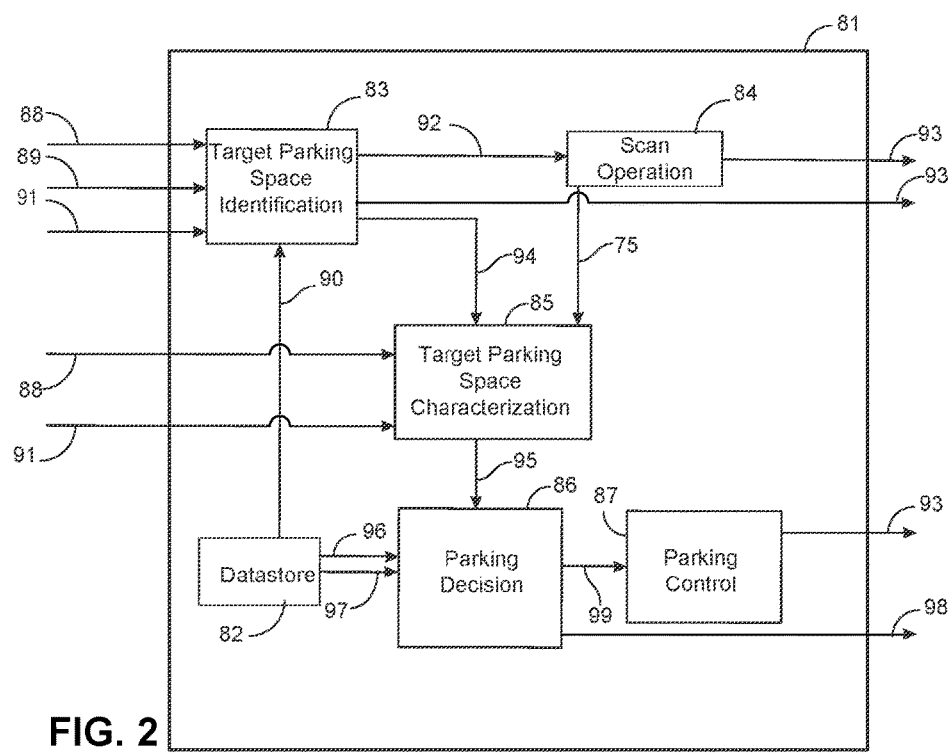
FIG. 2 is a dataflow diagram illustrating a control system that includes a part of the parking system of the autonomous vehicle, in accordance with various embodiments.

With reference to FIG. 2, a control system 81 may be embedded within the controller 34 and is included in the parking system 100 in accordance with various embodiments. That is, suitable software and/or hardware components of controller 34 (e.g., processor 44 and computer-readable storage device or media 46) are utilized to provide the control system 81 that is used in conjunction with the parking system 100 of the autonomous vehicle 10. For example, the control system 81 identifies and characterizes parking spaces and controls operation of the autonomous vehicle 10 based on the identification and characterization. In general, the control system 81 receives vehicle location information, destination information and sensor data indicative of an exterior environment of the autonomous vehicle, and determines vehicle modes of operation and provides outputs. A parking location within a parking space is determined based on parking space characterization and occupant location. The control system 81 includes dataflows that illustrate various operational aspects of the parking system 100. The control system 81 may be considered to implement one or more functional sub-units or modules. In various embodiments, the control system 81 is configured to generate control outputs and other signals. For example, as shown in more detail in FIG. 2 and with continued reference to FIG. 1, the parking system 100 includes a datastore 82, a target parking space identification module 83, a scan operation module 84, a target parking space characterization module 85, a parking decision module 86, and a parking control module 87. As can be appreciated, the modules 83, 84, 85, 86 and 87 shown in FIG. 2 are carried out by the processor 44 and may be combined and/or further partitioned to similarly operate according to the functions described herein.

In various embodiments, the datastore 82 stores data on the physical characteristics of the autonomous vehicle 10, such as in the data storage device 32. For example, the length 37, width 39, door open dimensions 33 of the front doors 25, 27, and door open dimensions 35 of the rear doors 29, 31 are stored. In various embodiments, the datastore 82 stores information on the seating arrangement, occupant location, and door location of the autonomous vehicle 10. In various embodiments, the vehicle datastore stores map information such as street and parking area detail data.

The target space identification module 83 receives data such as a vehicle location output 88 that indicates a vehicle location and vehicle destination output 89 that indicates the destination of the autonomous vehicle 10. The target space identification module 83 initiates operation based on received data. For example, the target space identification module 83 compares the vehicle location output 88 to the vehicle destination output 89 and when they converge, map information 90 from the datastore 82 is retrieved. From the map information 90 the target space identification module 83 identifies a parking area to search. Thereafter, the target space identification module 83 compares the current vehicle location as indicated by the vehicle location output 88 with the map information 90 and uses sensor outputs 91 to maneuver the autonomous vehicle 10 into and through the parking area through generated control signals 93. The autonomous vehicle 10 is maneuvered through the control signals 93, for example by providing signals to the actuator devices 42a-42n and the sensing devices 40a-40n as further detailed below. The target space identification module 83 monitors the sensor outputs 91 to identify an unoccupied target parking space. For example, from image camera data, it can be determined where free space exists. Once an unoccupied space is identified it is selected as a target parking space and the target space identification module generates a scan signal 92 provided to the scan operation module 84. In response, the scan operation module 84 generates control signals 93 to move the autonomous vehicle 10 to scan the target parking space for example, by activating the actuator devices 42a-42n and the sensing devices 40a-40n. The scan operation module 84 conducts a scan of the parking space for example, from radar data, lidar data and camera image data, objects and free space above the plane of the parking area surface are determined. Also for example, camera image data is used to locates parking space boundary lines on the plane of the parking space. The scan operation module 84 generates a signal of scan data 75, which is provided to the target parking space characterization module 85.

In a number of examples, the target space identification module 83 also generates an initiation signal 94 provided to the target parking space characterization module 85. The target parking space characterization module 85 receives the scan data 75 from the scan operation module 84. The target parking space characterization module 85 processes the received scan data 75 to characterize the parking space. The target parking space characterization module 85 evaluates any objects, free space and parking space boundary lines to characterize the target parking space as detailed below. The target parking space characterization module 85 generates characterization data 95, which is provided to the parking decision module 86. The parking decision module 86 also receives sensor data indicative of an occupant location within the autonomous vehicle 10 via occupant location output 96 from the datastore 82. The parking decision module 86 also receives vehicle characteristic data 97 from the datastore 82. The parking decision module 86 compares the characterization data 95 with the occupant location output 96 and vehicle characteristic data 97 to determine whether and how the parking space is used, as further detailed below. Depending on the outcome of the comparison, the parking decision module 86 either generates a continue search signal 98 provided to the target space identification module 83 which reinitiates a search, or a park signal 99 provided to the parking control module 87. The parking control module 87 generates control signals 93 to park the vehicle, for example by providing signals to the actuator devices 42a-42n and the sensing devices 40a-40n as further detailed below.

Figure 3:
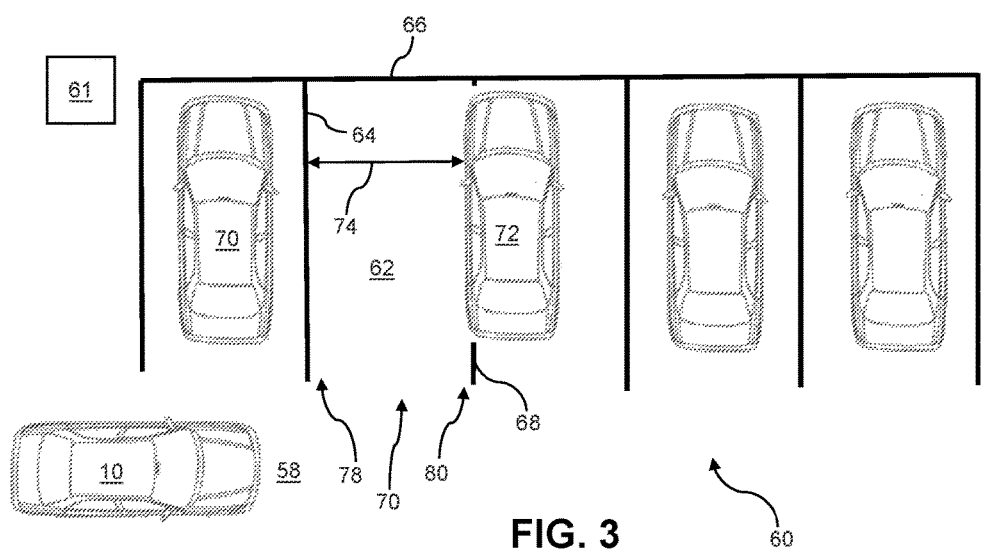
FIG. 3 is a schematic diagram of parking steps for the autonomous vehicle in accordance with various embodiments.

Referring to FIG. 3, when the autonomous vehicle 10 arrives at a destination for which parking is needed, a parking lot 60 may be searched, such as from an aisle 58, for an available parking space through the control system 81. An available parking space may be identified through the target parking space identification module 83 and may be referred to as the target parking space 62 into which the parking system 100 of the autonomous vehicle 10 initiates parking. The target parking space 62 may be defined by a longitudinal boundary line 64, a lateral boundary line 66, and a longitudinal boundary line 68. An entry 70 may be defined as an unlined opening into the target parking space 62. The target parking space 62 may have a left side 78 and a right side 80, as viewed from the perspective of the entry 70.

In a number of examples, the parking lot 60 may be an open lot where any available parking space may be used.

With an open lot, the autonomous vehicle 10 may scan the parking lot 60 using the sensor system 28 to identify a parking space free of other vehicles and any obstacles that would prevent its use. In other examples, the parking lot 60 may be a managed lot where parking spaces are assigned. The parking spaces may be pre-assigned for individual users, or they may be assigned upon entry. For example, the autonomous vehicle 10 may communicate via the communication system 36 with a management system 61, of the parking lot 60. The management system 61 may assign a specific parking space to the autonomous vehicle 10.

Figure 4:
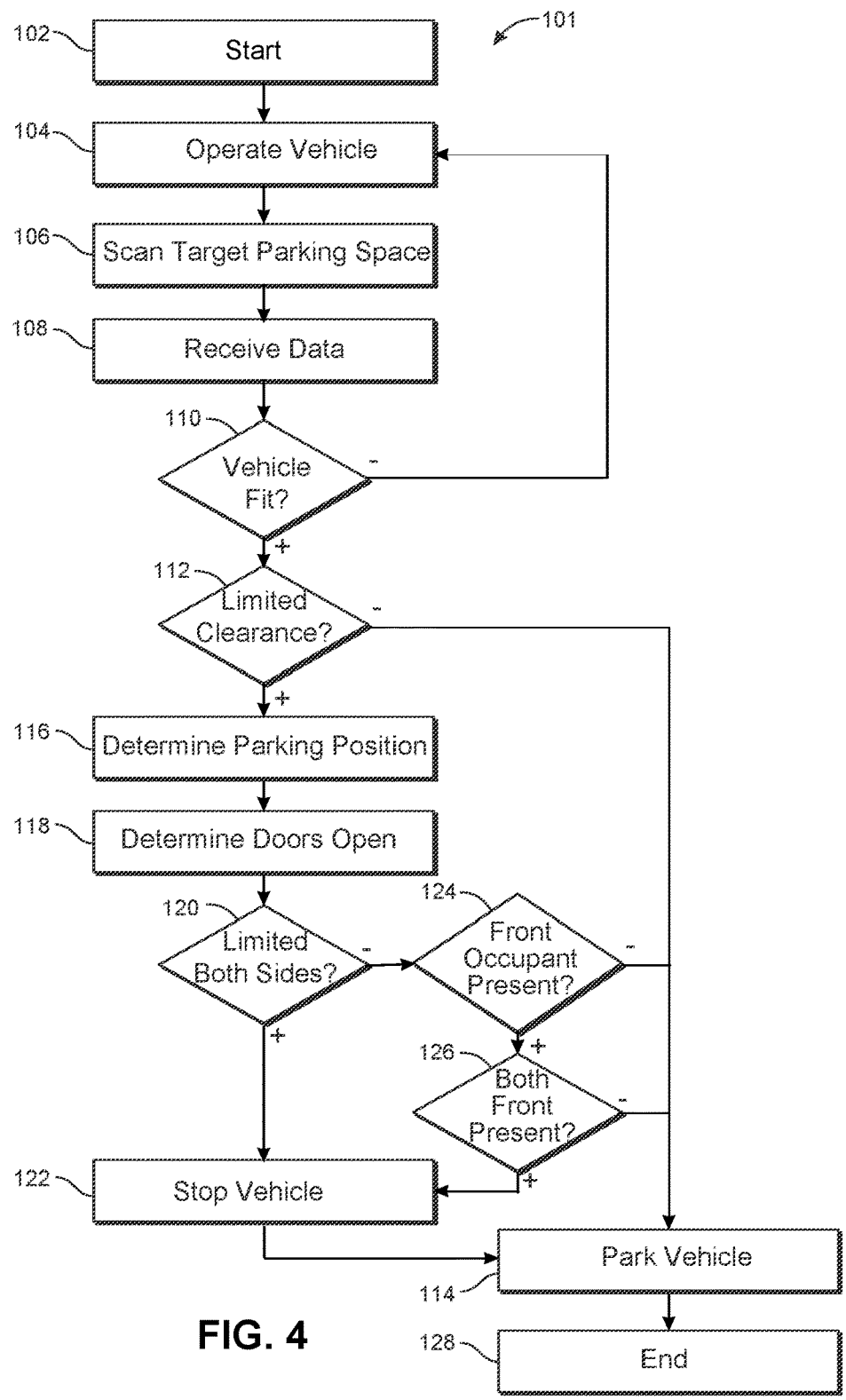
FIG. 4 is a flowchart illustrating a process employing control methods for controlling the autonomous vehicle according to a number of exemplary embodiments.

With additional reference to FIG. 4, when the target parking space 62 is approached, a parking process 101 of the autonomous vehicle 10 may be initiated at step 102 by the parking system 100, and may be carried out through the methods described herein. FIG. 4 is a flowchart of the process 101 carried out by the parking system 100 for parking a vehicle, in accordance with an exemplary embodiment. The process 101 may be implemented in connection with the autonomous vehicle 10, such as through the parking system 100 including the control system 81, and other systems, sub-systems, and components thereof, including any of those depicted in FIGS. 1 and 2. The process 101 is also described below in connection with FIGS. 1-12, which depict illustrative vehicle parking system details and activities, in accordance with exemplary embodiments.

As depicted in FIG. 4, the process 101 includes the initiation or start step 102. For example, in various embodiments, the process 101 may be initiated when the autonomous vehicle 10 arrives at a destination for which parking is needed. As referenced above, initiation may be effected by the target parking space identification module 83. In this embodiment, the process 101 continues until the autonomous vehicle 10 is parked. It should be appreciated that the process 101 may use other processes of the autonomous vehicle 10 initiated prior to, or after, step 102 and/or may use other data collected prior to, or after, step 102. For example, the physical dimension data of the autonomous vehicle 10 comprising dimension values 45 stored in the datastore 82 of the data storage device 32 may be referenced. As another example, the sensed door ajar values 47 stored in the datastore 82 of the data storage device 32 may be referenced. In various embodiments, a record may be made as to any driver elections with respect to clearance for parking purposes. For example, in certain embodiments, the vehicle occupant may be provided with elections for a preferred amount of clearance. This may be done when the occupant prefers a different level of clearance than the default amount sufficient to exit the vehicle through an open door. In a number of examples, elections may be represented and stored in the datastore 82 of the data storage device 32 of FIG. 1 for use in evaluating the sufficiency of the target parking space 62.

Figure 5:
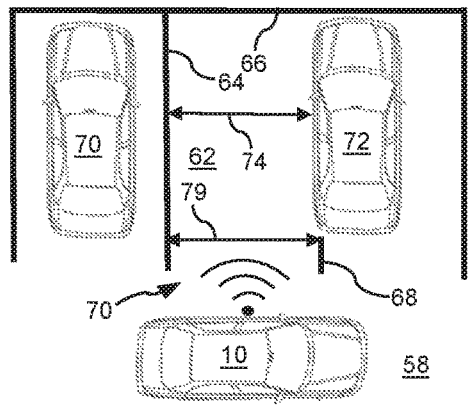
FIG. 5 is a schematic diagram of parking steps for the autonomous vehicle in accordance with various embodiments.
Figure 6:
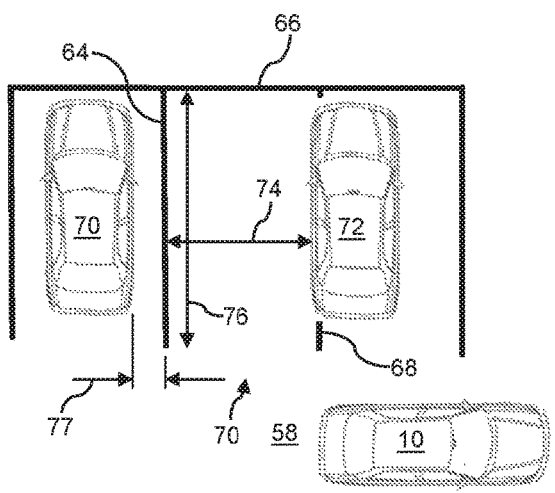
FIG. 6 is a schematic diagram of parking steps for the autonomous vehicle in accordance with various embodiments.

At step 104, the autonomous vehicle 10 may operate in the aisle(s) 58 of the parking lot 60 searching for an available parking space. The search may result in identification of the target parking space 62 through the target parking space identification module 83. The scan operation module 84 then directs the autonomous vehicle 10 to scan the target parking space 62 from the aisle 58 at step 106 to receive sensor data indicative of the exterior environment of the autonomous vehicle. The scan may include proceeding along the entry 70 of the target parking space 62 as illustrated in FIG. 5, and through the use of the sensor system 28, dimensions of the target parking space 62 may be determined. During the scan, the autonomous vehicle 10 may proceed in forward operation from the position of FIG. 3 where the target parking space 62 is generally forward of the autonomous vehicle 10 to the position of FIG. 6 where the target parking space 62 is generally rearward of the autonomous vehicle 10. The autonomous vehicle 10 may stop in the aisle 58 after crossing the entry 70 at the position of FIG. 6. In a number of examples, the location of the boundary lines 64, 66, 68 may also be sensed. The location of any adjacent vehicles 70, 72, relative to those lines may be observed and recorded. In one embodiment, a determination is made regarding the net width 74, as indicated in FIGS. 3, 5 and 6, of the net lateral parking space available for use. For example, any crowding of, or intrusion into, the target parking space 62 by any adjacent vehicles such as vehicle 70, 72 may be sensed. The length 76 of the target parking space 62 may also be sensed. At step 108 resulting values and determinations are provided to the target parking space characterization module 85 by the scan operation module 84. In some embodiments, the resulting values and determinations are stored as scan values 49 in the data storage device 32 of FIG. 1, and then provided to the target parking space characterization module 85, such as through the datastore 82. The target parking space characterization module 85 processes the received sensor data to characterize the parking space at step 108. Also in various embodiments, the determinations and categorizations of step 108 may be made by the control system 81. For example, the target parking space may be categorized as available, meaning that another vehicle is not present in a way that would prohibit use. In another example, the target parking space 62 may be categorized as unobstructed, meaning that objects are not present to an extent that would prohibit use.

Data is accessed with respect to various information. For example, dimension values 45 are provided from the datastore 82 with respect to various vehicle dimension data. Also for example, the data collected via the sensor system 28 and stored as the scan values 49, is recalled. In the parking decision module 86, the dimension values 45 may be compared to the scan values 49 at step 110 and a determination is made as to whether the autonomous vehicle 10 will fit within the target parking space 62. When the determination at step 110 is negative, meaning the autonomous vehicle 10 will not fit in the target parking space 62, the continue search signal 98 is generated by the parking decision module 86. As a result, the process 101 may return to step 104 and the search for another available parking space may continue via the target parking space identification module 83. When the determination at step 110 is positive, meaning the autonomous vehicle 10 will fit in target parking space 62, the process 101 proceeds to step 112. At step 112, the parking decision module 86 determines whether the target parking space 62 has limited lateral clearance. Limited lateral clearance means that the net width 74 across the target parking space 62 is limited to less than the space needed for occupants to comfortably evacuate through both sides of the autonomous vehicle 10 when it is parked in the target parking space 62. For example, gross width may be allocated by the parking lot's layout as determined by the distance 79 between the longitudinal boundary lines 64, 68 as shown in FIG. 5. The parking lot layout may assume clearance to open doors includes some space 77 as indicated in FIG. 6 that exists over the longitudinal boundary lines 64, 68 where the adjacent vehicles 70, 72 are centered in their spaces. The target parking space 62 is determined to have limited lateral clearance, such as when it is crowded, or intruded upon, by an adjacent vehicle. For example, the entire distance 79 may not be available, or the entire distance 79 with a portion of the space 77 may not be available. In other examples, limited lateral clearance exists when the distance between the adjacent vehicles 70, 71, or other objects, is lower than a threshold necessary to freely open the doors 25, 27, 29 or 31 as needed for occupant exit. When a negative determination is made at step 112, meaning width/lateral clearance is not limited, the process 101 may proceed to step 114 and through the parking control module 87 the autonomous vehicle 10 may park at a parking position within the target parking space 62. In a number of examples, the parking position is centered between the boundary lines 64 and 68. Once the vehicle is parked, the occupants may exit the autonomous vehicle 10 and the process 101 ends at step 128.

When a positive determination is made at step 112, meaning that lateral clearance of the target parking space 62 is limited, the process may proceed to step 116 and a parking position within the target parking space 62 is determined based on parking space characterization and occupant location. The parking decision module 86 receives sensor data indicative of an occupant location within the autonomous vehicle. For example, the recorded door ajar values 47 (or other occupant location data), may be supplied by the datastore 82. Proceeding to step 118 the controller 34, and more specifically the processor 44 through the parking decision module 86, determines which of doors 25, 27, 29, 31 will be opened for occupants to exit the autonomous vehicle 10. For example, if the door ajar values 47 show that doors 25 and 27 were opened when occupants entered the autonomous vehicle 10, the parking decision module 86 may conclude that doors 25 and 27 will be opened for occupants to exit the autonomous vehicle 10. In a number of examples, the process 101 may assume that occupants of rear seats 53, 54 may exit the autonomous vehicle 10 from either side. Accordingly, if the door ajar values 47 show that doors 29 and/or 31 were opened when occupants entered the autonomous vehicle 10, the controller 34 may conclude that either door 29 or 31 will be opened for occupants to exit the autonomous vehicle 10. When the parking decision module 86 determines that only one of the doors 29, 31 will be used for egress and the rear door on the opposite side of the vehicle was used for entry, the occupants of the rear seat 21 or 23 may be requested to exit from the opposite side. The parking control module 87 may signal the communication system 36 to communicate with in-vehicle occupants. For example, an occupant of right rear seat 23 may be asked to exit through left rear door 29. This assumes that rear seat passengers can slide across the autonomous vehicle 10 due to the absence of a barrier such as a console. In vehicles where a barrier does exist, use of the opposite side door may be omitted. In a number of examples, the decision may be overridden by the occupants, in which case the process 101 will continue based on the override, and use the same rear door 29, 31 for egress that was used for entry.

Figure 7:
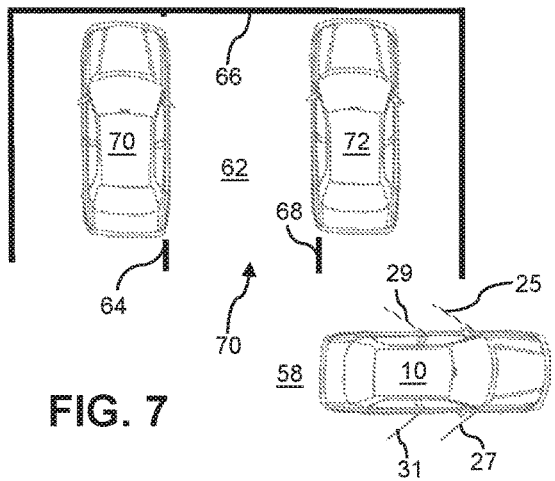
FIG. 7 is a schematic diagram of parking steps for the autonomous vehicle in accordance with various embodiments.
Figure 8:
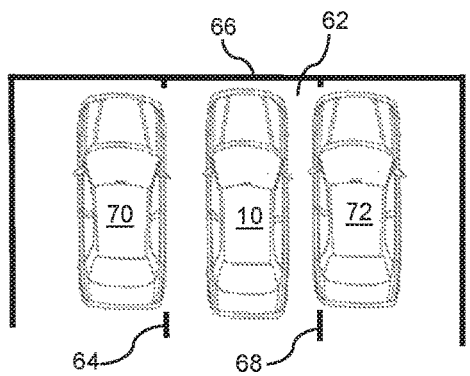
FIG. 8 is a schematic diagram of parking steps for the autonomous vehicle in accordance with various embodiments.

The process 101 may proceed to step 120 where the parking decision module 86 determines whether the target parking space 62 has limited lateral clearance on both sides of the autonomous vehicle 10 as depicted in FIG. 7. For example, this means that when the autonomous vehicle 10 is in the target parking space 62, the doors on both sides cannot be adequately opened so that an occupant cannot exit from either side. When a positive determination is made that the target parking space 62 has limited lateral clearance on both sides of the autonomous vehicle 10, the process 101 may proceed to step 122. At step 122, in response to the parking control module 87 the autonomous vehicle 10 stops in the aisle 58 and releases the occupants as depicted in FIG. 7, prior to parking. For example, the parking control module 87 may signal the communication system 36 to deliver a message requesting the occupant(s) to exit the autonomous vehicle 10. All doors 25, 27, 29, 31 may be opened. Once the occupant(s) have exited and cleared the vehicle, the process 101 may proceed to step 114 and the parking control module 87 may control the autonomous vehicle 10 to self-park in the target parking space 62 at a parking position with limited lateral clearance on both sides as depicted in FIG. 8. For example, the parking control module 87 operates one or more actuator devices 42a-42n to maneuver the autonomous vehicle into the target parking space 62. The autonomous vehicle 10 is stopped and parked within the boundary lines 64, 66 and 68. In a number of examples, the autonomous vehicle 10 may be parked centered in the target parking space 62 between the adjacent vehicles 70, 72.

Figure 12:
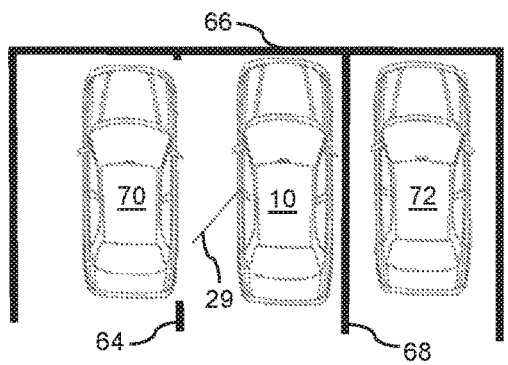
FIG. 12 is a schematic diagram of parking steps for the autonomous vehicle in accordance with various embodiments.

When a negative determination is made at step 120, meaning that the target parking space 62 has limited lateral clearance on only one side 78 or 80, the process 101 may proceed to step 124. At step 124 the parking decision module 86 determines whether an occupant is present in any of the front seats 15 and/or 17 of the autonomous vehicle 10. In this example, the question is whether either or both front seats are occupied. When the determination is negative and only rear seat passengers are present, the process 101 may proceed to step 114 and the parking control module 87 parks the autonomous vehicle 10 at a parking position with offset such as shown in FIG. 12. The parking control module 87 operates one or more actuator devices 42a-42n to maneuver the autonomous vehicle 10 into the target parking space 62. The autonomous vehicle 10 may be parked closer to the boundary line 68 than to the boundary line 64. The door 29 may be freely opened and the rear seat passengers may exit. The parking control module 87 may signal the communication system 36 to request exit of all rears seat passengers through the left side rear door 29. Once the occupants have evacuated the autonomous vehicle 10 and closed the door(s), the process 101 may end at step 128.

Figure 10:
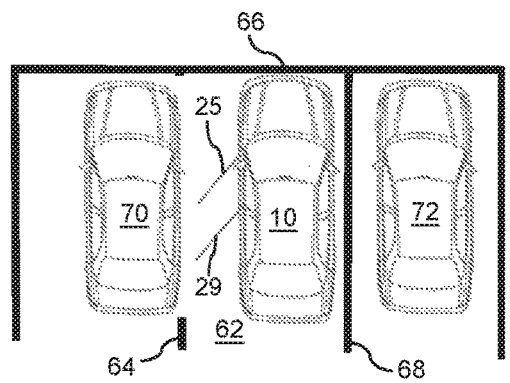
FIG. 10 is a schematic diagram of parking steps for the autonomous vehicle in accordance with various embodiments.
Figure 11:
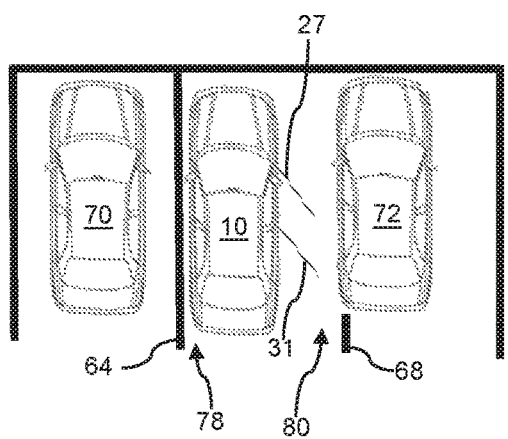
FIG. 11 is a schematic diagram of parking steps for the autonomous vehicle in accordance with various embodiments.

Returning to step 124, when the determination is positive and a front seat occupant is present, the process 101 may proceed to step 126. At step 126 the parking decision module 86 determines whether occupants are present at both the left front seat 15 and the right front seat 17. For example, the door ajar values 47 may be recalled as indicating which sides of the autonomous vehicle 10 has occupants. When the determination at step 126 is negative, meaning that no occupant is present in either front seat, or meaning that an occupant is present in only one front seat, the process may proceed to step 114 and the parking control module 87 parks the autonomous vehicle 10 in the target parking space 62, at a parking position with lateral offset as shown in FIG. 11 for exit of the rear seat occupant(s) and the one front seat occupant. In the example of FIG. 11, where the right front seat 17 is occupied and the autonomous vehicle 10 is parked closer to the longitudinal boundary line 64 than to the longitudinal boundary line 68. Parking offset toward the line 64 provides space on the right side 80 of the target parking space 62. One or both of the doors 27, 31 may be opened for occupant egress. In another example, limited clearance may exist on the left side 78 of the target parking space 62 and occupants may be located on the left side of the autonomous vehicle 10, whether in the left front seat, the left rear seat, or both the left front and left rears seats. The parking control module signals operation of one or more actuator devices 42a-42n to maneuver the autonomous vehicle 10 into the target parking space 62. For example, the autonomous vehicle may proceed in reverse to the position of FIG. 3, and then enter the target parking space 62 under forward operation. In this example, the autonomous vehicle 10 may park as shown in FIG. 10, offset in the target parking space 62 toward the line 68, since the adjacent vehicle 70 is the cause of limited clearance. The occupants may exit through one or both of the doors 25, 29. Once the occupants have evacuated the autonomous vehicle 10 and closed the door(s), the process 101 may end at step 128.

Returning to step 126, when the determination is positive and front seat occupants are present in both seats 15 and 17, the process 101 may proceed to step 122. At step 122 the autonomous vehicle 10 releases the occupants as depicted in FIG. 7, prior to parking. For example, under control of the parking control module 87 the autonomous vehicle 10 may be stopped in position in the aisle 58. The parking control module 87 signals the communication system 36 to deliver a message requesting the occupant(s) to exit the autonomous vehicle 10. Once the occupant(s) have evacuated and cleared the vehicle, the process 101 proceeds to step 114 and the parking control module 87 controls the autonomous vehicle 10 to park at a parking position in the target parking space 62. The parking control module generates signals for operation of one or more actuator devices 42a-42n to maneuver the autonomous vehicle 10 into the target parking space 62. Once the autonomous vehicle 10 is parked and stopped, the process 101 may end at step 128.

In some embodiments, when determined that there is limited lateral clearance exists so that occupants will be able to exit from only one side of the vehicle, and occupants exist on both sides of the vehicle, the occupants may be given the option of exiting in the aisle 58 or from one side in the target parking space 62. For example, this means that when the autonomous vehicle 10 is in the target parking space 62, the doors on both sides cannot be adequately opened so that an occupant cannot exit from either side. In these embodiments in response to the parking control module 87 such as at step 122, the autonomous vehicle 10 stops in the aisle 58. The parking control module 87 may signal the communication system 36 to deliver a message inquiring of the occupant(s) whether they prefer to exit the autonomous vehicle 10 from opposite sides in the aisle 58, or from the same side in the target parking space 62. The occupants are prompted to make a selection such as via voice response or a selector input. If editing in the aisle is selected, once the occupant(s) have exited and cleared the vehicle, the process 101 may proceed to step 114 and the parking control module 87 may control the autonomous vehicle 10 to self-park in the target parking space 62 at a parking position. If exiting from one side in the target parking space 62 is selected, the autonomous vehicle 10 parks with offset, such as shown in FIG. 10. The occupants are prompted to exit through the left side of the vehicle, for example. The occupants exit through one or both of the doors 25, 29. Once the occupants have evacuated the autonomous vehicle 10 and closed the door(s), the process 101 may end at step 128.

Table 1 provides a summary of examples for the outcome of process 101 for various door ajar and limited clearance combinations. Outcomes 1 and 2 are shown. Outcome 1 means the autonomous vehicle 10 parks in the target parking space 62, with lateral offset. Outcome 2 means the occupants are released in the aisle 58 and then the autonomous vehicle 10 parks in the target parking space 62. For example, when the door ajar values 47 indicate a door or doors were opened to load occupants on either the right side or left side (right or left), and there is limited clearance on one side of the target parking space 62, then outcome 1 results. This means that the autonomous vehicle 10 parks in the target parking space 62, with lateral offset. In another example from Table 1, when the door ajar values 47 indicate a door or doors were opened to load occupants on both the right side and left side (right and left), and there is limited clearance on both sides of the target parking space 62, then outcome 2 results. This means that the occupants are released in the aisle 58 and then the autonomous vehicle 10 parks in the target parking space 62.

TABLE 1

| Door Ajar Right/Left | Door Ajar Front/Rear | Limited clearance on one side | Limited clearance on both sides | Outcome |
| --- | --- | --- | --- | --- |
| Right or Left | Front | X | | 1 |
| Right or Left | Front | | X | 2 |
| Right or Left | Rear | X | | 1 |
| Right or Left | Rear | | X | 2 |
| Right & Left | Front | X | | 2 |
| Right & Left | Front | | X | 2 |
| Right & Left | Rear | X | | 1 |
| Right & Left | Rear | | X | 2 |
| Right & Left | Front & Rear | X | | 2 |
| Right & Left | Front & Rear | | X | 2 |

Figure 9:
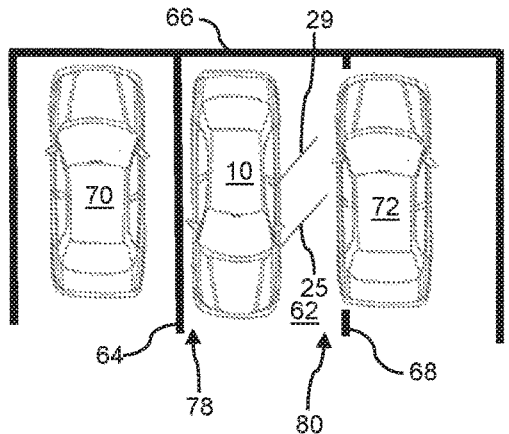
FIG. 9 is a schematic diagram of parking steps for the autonomous vehicle in accordance with various embodiments.

Accordingly, when lateral offset parking is employed for outcomes 1, the occupants will exit from either the left or the right side of the autonomous vehicle 10, and parking proceeds with an offset relative to the lines 64 and 68. For example, occupants may be located at one or both of the left seats 15, 21 of the autonomous vehicle 10. As shown in FIG. 9, the vehicle 72 may be the cause of limited lateral clearance on the right side. The autonomous vehicle 10 may be parked offset toward the line 64 on left side of the of the target parking space 62. For outcomes 2, the autonomous vehicle 10 releases its occupants prior to parking. Because the doors 25, 27, 29, 31 do not require opening after parking, the autonomous vehicle 10 may park at or near center of the target parking space 62.

With regard to parking from the aisle positions of FIG. 6 or FIG. 7, the parking control module effects reverse operation of the autonomous vehicle 10 to the position of FIG. 3, and then forward operation to enter the target parking space and park forward as depicted in FIG. 8. In other examples, the autonomous vehicle 10 may be operated to move into the target parking space 62 under reverse operation from the aisle 58 and park reversed as depicted in FIG. 9. In some examples, reverse parking may be employed as a driver preference election and configured as a stored election in the datastore 82. In other examples, reverse parking may also be employed by the control system 81. If reverse parking is not employed, the autonomous vehicle 10 is operated in reverse from the positions of FIG. 6 or FIG. 7 to the position of FIG. 3, and then enters the target parking space 62 under forward operation. In other examples, the forward, reverse parking direction may be communicated from the parking lot management system, or determined based on which side of the target parking space 62 is limited as described herein.

Through the parking system 100 and the process 101, parking of the autonomous vehicle 10 within a target parking space 62 with limited clearance is accomplished. The autonomous vehicle may be parked offset within the target parking space 62. As can be appreciated, the subject matter disclosed herein provides certain enhanced features and functionality to what may be considered as a standard or baseline autonomous vehicle 10. To this end, an autonomous vehicle and autonomous vehicle can be modified, enhanced, or otherwise supplemented to provide the additional features described in more detail below.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of parking an autonomous vehicle comprising:
scanning, by a first sensor, a target parking space while traveling in an aisle across an entry to the target parking space to generate first sensor data;
stopping, by at least one processor, the autonomous vehicle in the aisle after crossing the entry;
receiving, from the first sensor, first sensor data indicative of an exterior environment of the autonomous vehicle including of the target parking space;
processing, by the at least one processor, the received first sensor data to determine a parking space characterization;
receiving, from a second sensor, second sensor data indicative of an occupant location within the autonomous vehicle;
determining, by the at least one processor, a parking position within the target parking space based on the parking space characterization and the occupant location; and
generating, by the at least one processor, control signals to operate one or more actuator devices of the autonomous vehicle; and
maneuvering, by the one or more actuator devices, the autonomous vehicle into the target parking space at the parking position to accommodate any limited clearance in the target parking space.

2. The method of claim 1 comprising:
providing, by the processor, a message to exit the autonomous vehicle prior to operating the one or more actuator devices to maneuver the autonomous vehicle into the parking space.

3. The method of claim 1 comprising:
obtaining door ajar values for the autonomous vehicle, wherein receiving the second sensor data indicative of an occupant location within the autonomous vehicle comprises receiving the obtained door ajar values; and
determining, by the processor, whether a left door or a right door of the autonomous vehicle requires opening to evacuate the autonomous vehicle based on the obtained door ajar values.

4. The method of claim 1 comprising:
determining, by the processor, whether a front door of the autonomous vehicle requires opening to evacuate the vehicle; and
when a front door requires opening, generating, by the processor, a message to exit the autonomous vehicle prior to operating the one or more actuator devices to maneuver the autonomous vehicle into the parking space.

5. The method of claim 1 comprising:
determining, by the processor, a side of the parking space where resides a limited lateral clearance; and
stopping, by the processor, the autonomous vehicle with the parking position laterally offset closer to an opposite side of the parking space from the side.

6. The method of claim 1 comprising:
scanning, by the processor, the parking space to locate a pair of longitudinal boundary lines; and
wherein the parking position is closer to one of the longitudinal boundary lines than to the other of the longitudinal boundary lines.

7. The method of claim 1 comprising:
determining, by the processor, whether a limited lateral clearance exists on both a left side and a right side of the parking space; and
when the limited lateral clearance is on both sides of the parking space, generating, by the processor, a message to exit the autonomous vehicle prior to operating the one or more actuator devices to maneuver the autonomous vehicle into the parking space.

8. The method of claim 1 comprising:
generating, by the processor, a message to exit the autonomous vehicle while the autonomous vehicle is stopped in the aisle.

9. The method of claim 8 comprising:
waiting for an evacuation of the autonomous vehicle while the autonomous vehicle is stopped in the aisle; and
operating, by the processor, the one or more actuator devices to maneuver the autonomous vehicle into the parking space after the evacuation of the autonomous vehicle.

10. The method of claim 1 comprising:
determining, by the processor, whether the parking space has a limited lateral clearance, wherein the limited lateral clearance is created by an adjacent vehicle crowding the target parking space.

11. The method of claim 1 comprising:
providing, by the processor, a message to exit the autonomous vehicle while the autonomous vehicle is stopped in the aisle.

12. The method of claim 11 comprising:
waiting for evacuation of the autonomous vehicle while the autonomous vehicle is stopped in the aisle; and
operating, by the processor, the one or more actuator devices to maneuver the autonomous vehicle into the parking space, after the evacuation of the autonomous vehicle.

13. The method of claim 1 wherein:
receiving the second sensor data indicative of an occupant location within the autonomous vehicle comprises:
monitoring, by the processor, door ajar sensors to obtain door open data;
storing the door open data as the stored values; and
accessing, by the processor, the stored values.

14. The method of claim 13 comprising:
determining, by the processor, whether a left door or a right door of the autonomous vehicle requires opening to evacuate the autonomous vehicle, based on the stored values.

15. A system for parking an autonomous vehicle comprising:
a first sensor configured to generate exterior data indicative of an exterior environment of the autonomous vehicle, including of a target parking space;

a processor receiving the exterior data and configured to:
  evaluate, by a target parking space characterization module and based on the exterior data, any objects, free space and parking space boundary lines of the target parking space; and
  characterize, using the exterior data, the target parking space concerning availability for use and any limited clearance in the target parking space to obtain a parking space characterization;
a second sensor configured to generate interior data indicative of an occupant location within the autonomous vehicle;
the processor, configured to determine a parking position of the autonomous vehicle based on the parking space characterization, including the limited clearance, and the occupant location; and
one or more actuator devices configured to maneuver the autonomous vehicle into the parking space at the parking position in response to signals from the processor and to accommodate the limited clearance.

16. The system of claim 15 wherein the processor comprises:
  a target parking space identification module configured to identify the parking space and to generate a scan signal based on identification of the parking space; and
  a scan control module configured to receive the scan signal and to generate a control signal,
  wherein the one or more actuators are responsive to the control signal.

17. The system of claim 15 wherein the processor comprises:
  a target parking space characterization module configured to receive the exterior data and in response, to generate the parking space characterization as characterization data of the parking space; and
  a parking decision module configured to receive and process the characterization data to determine the parking position.

18. An autonomous vehicle comprising:
a body having a number of doors configured to open;
a first sensor configured to generate exterior data indicative of an exterior environment of the autonomous vehicle;
a processor receiving the exterior data and configured to determine a parking space characterization for a target parking space based on the external data;
a second sensor configured to sense an opening of at least one door for occupant entry to generate interior data indicative of an occupant location within the autonomous vehicle;
the processor, configured to determine whether the parking space characterization includes the parking space is available and unobstructed to allow use, including whether there is limited clearance;
the processor, configured to determine a parking position of the autonomous vehicle based on the parking space characterization and the occupant location to enable occupant exit through the at least one door corresponding to the sensed opening; and
one or more actuator devices carried by the body and configured to maneuver the autonomous vehicle into the parking space at the parking position in response to signals from the processor, wherein the parking position accommodates the limited clearance when present.

* * * * *